United States Patent
Wynn et al.

(10) Patent No.: US 7,043,666 B2
(45) Date of Patent: May 9, 2006

(54) SYSTEM AND METHOD FOR RECOVERING FROM MEMORY ERRORS

(75) Inventors: Allen C. Wynn, Round Rock, TX (US); Frank L. Wu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 481 days.

(21) Appl. No.: 10/055,374

(22) Filed: Jan. 22, 2002

(65) Prior Publication Data

US 2003/0140271 A1    Jul. 24, 2003

(51) Int. Cl.
G06F 11/00     (2006.01)
(52) U.S. Cl. .......................................... 714/8; 714/710
(58) Field of Classification Search .................... 714/8, 714/710, 54, 49, 36
See application file for complete search history.

(56) References Cited

U.S. PATENT DOCUMENTS

| | | | |
|---|---|---|---|
| 5,245,615 A * | 9/1993 | Treu ............................. | 714/45 |
| 5,758,056 A * | 5/1998 | Barr ............................. | 714/7 |
| 5,974,564 A * | 10/1999 | Jeddeloh ........................ | 714/8 |
| 6,012,127 A | 1/2000 | McDonald et al. .......... | 711/141 |
| 6,026,472 A | 2/2000 | James et al. ................ | 711/147 |
| 6,105,053 A | 8/2000 | Kimmel et al. ............. | 709/105 |
| 6,289,424 B1 | 9/2001 | Stevens ....................... | 711/170 |
| 6,326,973 B1 | 12/2001 | Behrbaum et al. ........... | 345/532 |
| 6,351,822 B1 * | 2/2002 | Wright et al. .................. | 714/8 |
| 6,408,401 B1 * | 6/2002 | Bhavsar et al. ................ | 714/7 |
| 6,463,550 B1 * | 10/2002 | Cepulis et al. ................ | 714/25 |
| 6,467,048 B1 * | 10/2002 | Olarig et al. .................. | 714/7 |
| 6,615,375 B1 * | 9/2003 | Mounes-Toussi et al. ..... | 714/54 |
| 2002/0184557 A1 * | 12/2002 | Hughes et al. ................. | 714/8 |
| 2003/0093711 A1 * | 5/2003 | Harari et al. .................. | 714/8 |
| 2003/0126497 A1 * | 7/2003 | Kapulka et al. ............... | 714/8 |

OTHER PUBLICATIONS

"DIMM". http://searchwin2000.techtarget.com/sDefinition/0,,sid1_gci213901,00.html.*

"*Advanced Configuration and Power Interface Specification*" by Compaq Corporation, Intel Corporation, Microsoft Corporation, Phoenix Technologies Ltd., and Toshiba Corporation. Revision 2.0. Jul. 27, 2000.

U.S. Appl. No. 09/603,033 entitled "*System and Methods for Recovering Memory for Computer Systems*" Filed Jun. 23, 2000. Inventors: Roy W. Stedman, Gary D. Huber and Thomas Vrhel, Jr. and assigned to Dell Products L.P.

* cited by examiner

*Primary Examiner*—Robert Beausoliel
*Assistant Examiner*—Yolanda Wilson
(74) *Attorney, Agent, or Firm*—Baker Botts L.L.P.

(57) ABSTRACT

A system with capabilities for recovering from memory errors includes memory and a processor in communication with the memory. The system also includes an operating system and a BIOS which reside in the memory and are executable by the processor. The BIOS includes recovery logic that detects a memory error in a section of the memory and, in response, instructs the operating system to discontinue use of the section of memory with the memory error. For instance, the system may include multiple memory objects that represent respective sections of the memory. The recovery logic may instruct the operating system to discontinue use of the section of memory with the memory error by sending an eject event to the operating system.

20 Claims, 4 Drawing Sheets

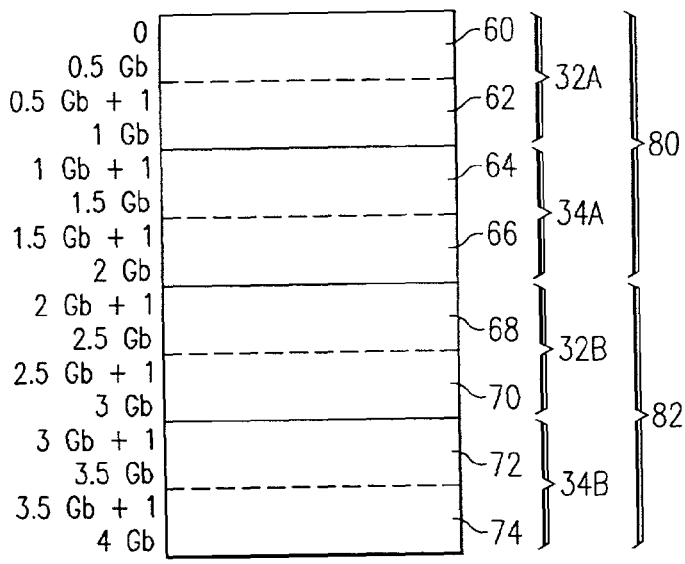
FIG. 3A
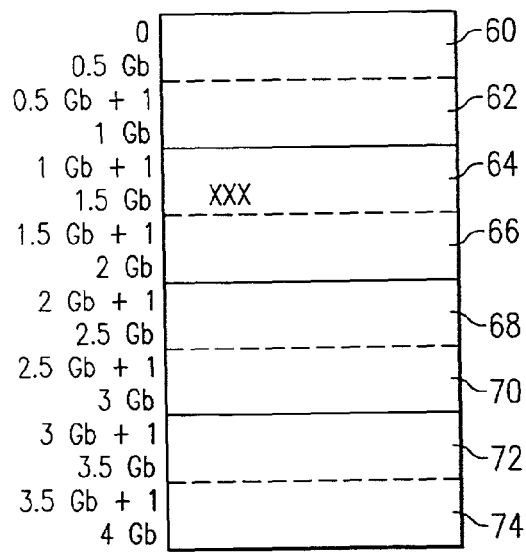
FIG. 3B
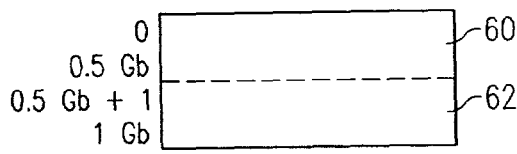
FIG. 3C
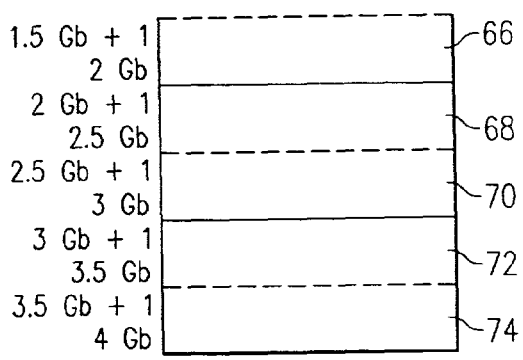

SYSTEM AND METHOD FOR RECOVERING FROM MEMORY ERRORS

TECHNICAL FIELD

The present disclosure relates in general to information handling systems. In particular, this disclosure relates to systems, methods, and program products for recovering from memory errors in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One common type of information handling system is the network server. A typical server includes one or more processors that execute program instructions, one or more memory modules that store program instructions and data, and a chipset with a memory manager that controls how the processors interact with the memory modules. For example, the INTEL 460GX chipset groups four dual inline memory modules (DIMMs) into a row. Thus, if a user has installed sixteen DIMMs that each have a memory capacity of 1 gigabyte (GB), the chipset creates four rows of memory, and each row contains 4 GB. The storage in the memory rows that the memory manager makes available to the processors is known as the "physical address space." Typically, the physical address space is described in a memory address map.

A typical server also includes many different layers of software, including, at a very low level, a basic input and output system (BIOS). The BIOS generally handles such tasks as testing the hardware at startup and providing a software interface to certain hardware components during normal operations. At a slightly higher level is the operation system (OS), which provides basic services for high level applications (e.g., web server applications, database engines, etc.) to utilize the hardware components.

In order to protect against memory failures, some chipsets provide what is known as a "spare row feature." Such a system reserves one row of memory for use in case of a malfunction in one of the non-reserved (or "active") rows. Specifically, the chipset reserves the spare row by not mapping the memory modules in the reserved row into the physical address space. Therefore, the reserved row is not seen by the operating system. When an error is detected, the BIOS causes the chipset to copy the contents of the failing row to the reserved row and then activates the reserved row by mapping it into the physical address space in place of the failing row.

This process, known as "swapping in the spare row," happens very quickly, and it does not interrupt the operating system or cause the server to reboot. In fact, the spare row recovery procedure is basically invisible to the operating system. For instance, swapping in the spare row does not affect the memory addresses used by the operating system, and the operating system does not participate in the process of swapping in the spare row.

The spare row feature thus provides a convenient way to recover from memory errors in network servers and other systems that require a high degree of dependability. However, as recognized by the present invention, the spare row feature also presents a number of disadvantages.

SUMMARY

Spare row support works best in a monolithic system, where all memory is connected to one memory controller. One of the disadvantages of the spare row methodology is that a system cannot use spare row recovery unless the chipset includes spare row support. For instance, the chipset must provide for fast and seamless copying of the contents of a row of memory into the spare row and re-mapping of the spare memory row. Many chipsets do not provide spare row support.

Furthermore, it would be very difficult or counterproductive to design spare row support into many types of chipsets, including chipsets designed for use in distributed memory systems, modular systems, or non-uniform memory access (NUMA) architectures. For example, it would be very difficult to implement spare row support in a cache coherent non-uniform memory access (cc-NUMA) system, where memory is distributed across connected nodes, with each node containing a portion of the system memory. It might be necessary either to provide each node with a spare row of memory or to provide chipset support for swapping and utilizing a spare row across nodes. Without chipset support, the time required to copy the contents of a large row of memory would cause errors for most operating systems. A system with chipset support for a shared spare row would likely have sub-optimal performance in operations such as general accesses to memory.

Another disadvantage of the spare row methodology is inefficiency. Since the granularity for memory recovery is one row, a significant portion of the installed memory remains unused. For instance, in the system described above with sixteen GB of installed memory, one fourth of that memory (four GB) is not available for general use, either because a row has been reserved for use in memory recovery, or because a row has been swapped out due to memory errors.

In additional, spare row support typically only provides for one instance of recovery. That is, once the spare row has been swapped in, spare row support does not provide recovery for any subsequent memory errors.

The present disclosure relates to a system, a method, and software for recovering from memory errors. An example embodiment of such a system includes memory and a processor in communication with the memory. The system also includes an operating system and a BIOS which reside in the memory and are executable by the processor. The BIOS includes recovery logic that detects a memory error in a section of the memory and, in response, instructs the operating system to discontinue use of the section of memory with the memory error.

For instance, the system may include multiple memory objects that represent respective sections of the memory. The recovery logic may instruct the operating system to discontinue use of the section of memory with the memory error by sending an eject event to the operating system. The eject event may identify the memory object that represents the section of memory with the memory error. In response to the eject event, the operating system may invoke an eject method to disable the section of memory with the memory error.

Additional features of various embodiments of the present invention are described at some length below. The teachings of the present disclosure may be used to provide error recovery in a distributed system such as a NUMA system. Also, a system with one or more of the disclosed error recovery features may provide a higher level of performance, may provide for finer granularity in error recovery, and may be more efficient, relative to systems that use the spare row methodology. A system according to the present disclosure may also provide for multiple successive recovery processes without rebooting the system or physically replacing faulty memory. Other embodiments that provide additional advantages may be apparent to those of ordinary skill in the art.

BRIEF DESCRIPTION OF THE DRAWINGS

The present disclosure and its numerous objects, features, and advantages may be more fully understood by reference to the following description of an example embodiment and the accompanying drawings, in which:

FIGS. 3A–3E present block diagrams of example memory address spaces for the NUMA system of FIG. 1.

DETAILED DESCRIPTION OF AN EXAMPLE EMBODIMENT

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices, and various input and output (I/O) devices, such as a keyboard, a mouse, and a video display. The information handling system may also include one or more buses operable to transmit communications between the various hardware components.

Figure 1:
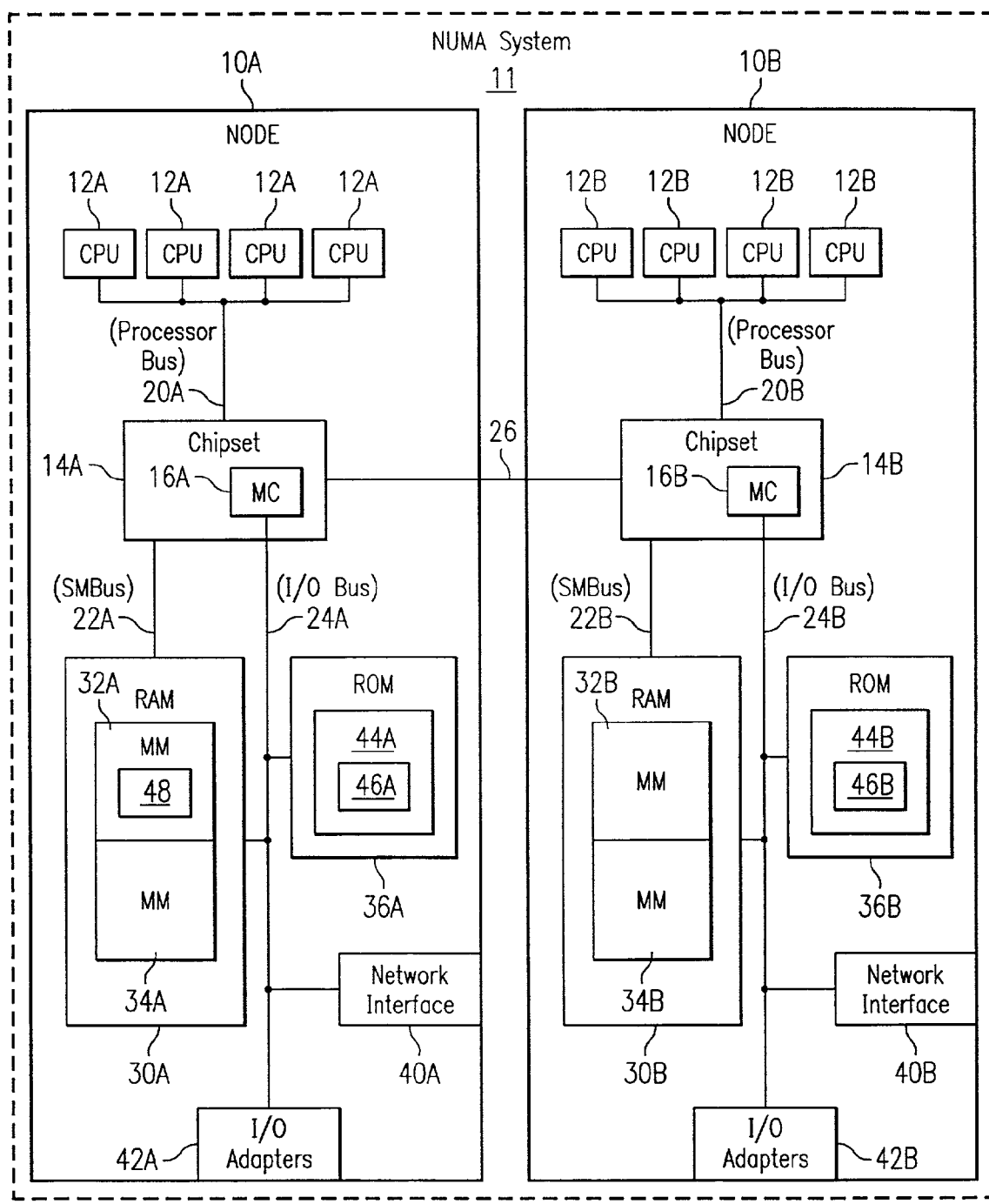
FIG. 1 presents a block diagram of an example embodiment of a NUMA system with support for recovery from memory errors according to the present invention.

Referring now to FIG. 1, for purposes of illustration, this disclosure uses three example information handling system 10A, 10B, and 11 to illustrate various aspects of the invention and various additional or alternative features of the invention. Specifically, FIG. 1 illustrates two NUMA nodes 10A and 10B that cooperate to form a NUMA system 11. Nodes 10A and 10B may also be referred to as hosts, and NUMA system 11 may also be referred to generally as a distributed information handling system or a distributed computing system.

As illustrated, node 10A includes four central processing units (CPUs) 12A and a chip set 14A that is connected to CPUs 12A by a processor bus 20A. Included in chip set 14A is a memory controller 16A. Node 10A also includes various types of computer memory, including random access memory (RAM) 30A and ROM 36A. RAM 30A may be formed from multiple memory modules 32A and 34A, such as dual in-line memory modules (DIMMs) or other suitable memory packages. Specifically, in the illustrated embodiment, each node includes two memory modules, and each of those memory modules has a storage capacity of 1 GB. Thus, NUMA system 11 includes 4 GB of installed RAM. Generally, CPUs 12A communicate with RAM 30A via memory controller 16A and I/O bus 24A, which connects RAM 30A and ROM 36A with memory controller 16A. However, node 10A also includes a system management bus (SMBus) 22A for operations such as performing hardware detection and setup of RAM 30A. Also connected to I/O bus 24A are a network interface 40A and various I/O adapters 42A for sending and receiving output and input from devices such as a keyboard, a pointing device, and a video display.

A BIOS 44A resides in ROM 36A, and BIOS 44A may be loaded into RAM 30A upon system initialization to perform various hardware diagnostic and configuration functions and to provide an interface to the hardware for various higher level software packages. In the illustrated embodiment, ROM 44A includes error recovery logic 46A for detecting and recovering from memory errors, as described in greater detail below.

A NUMA pipe 26 connects nodes 10A and 10B, and node 10B includes substantially the same components as node 10A, as depicted at reference numbers 12B through 46B. In addition, an operating system 48 may reside on one or more of the nodes, for example operating out of RAM 30A.

Figure 2:
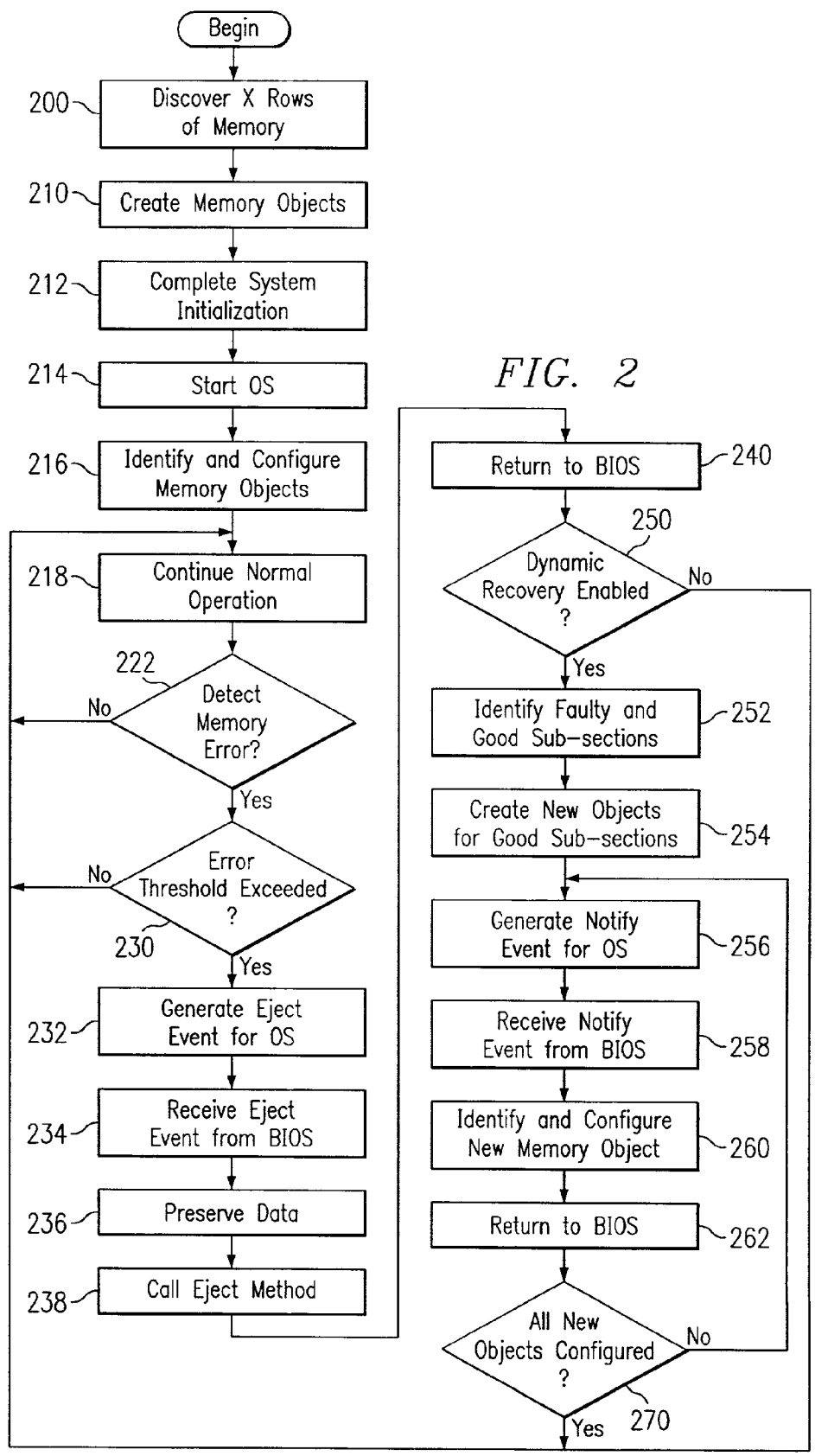
FIG. 2 presents a flowchart of an example embodiment of a process for recovering from memory errors.

Referring now to FIG. 2, there is illustrated a flowchart of an example embodiment of a process for recovering from memory errors according to the present invention. The example process begins with BIOS 44A initializing node 10A. As depicted at block 200, in the initialization process, BIOS 44A performs hardware discovery routines in which BIOS 44A discovers the two memory modules 32A and 34A in node 10A. Then, as shown at block 210, BIOS 44A creates memory objects to represent sections of RAM 30A. As depicted at block 212, BIOS 44A then completes system initialization for node 10A. This process also applies to node 10B, with BIOS 44B operating in substantially the same manner as BIOS 44A to discover memory modules 32B and 34B, create memory objects relating to those memory modules, and complete BIOS initialization of node 10B. As depicted at block 214, after BIOS initialization has been completed for nodes 10A and 10B, control is passed to operating system 48.

As illustrated at block 216, operating system 48 then identifies and configures the memory objects to make the corresponding sections of RAM 30A available for use, as depicted at block 216. For instance, after operating system 48 has configured the memory objects, the corresponding sections of RAM 38 will be available in a memory address table maintained by memory controller 16A. As shown at block 218, operating system 48 then continues normal operations. Consequently, in the example embodiment, once the initialization process is complete, NUMA system 11 will contain memory objects that collectively describe a physical address space which spans the entire 4 GB of RAM installed in nodes 10A and 10B.

For example, as illustrated in FIG. 3A, in the example embodiment, chip sets 14A and 14B treat each pair of memory modules within a host as a single row of memory. Accordingly, chip sets 14A and 14B recognize two rows of memory in NUMA system 11, as indicated at reference numbers 80 and 82, with row 80 containing memory modules 32A and 34A, and with row 82 containing memory modules 32B and 34B. Also, in the example embodiment, BIOS 44A and BIOS 44B create multiple memory objects for each row. Specifically, BIOS 44A and BIOS 44B create one parent memory object for each row, as well as four child memory objects for each parent object. The parent objects may be advanced configuration and power interface (ACPI) module devices, and the child objects may be ACPI memory devices, for instance. Thus, after BIOS 44A and BIOS 44B have created the parent and child memory objects and operating system 48 has configured the child memory objects, NUMA system 11 will contain eight child memory objects 60 through 74. Furthermore, memory objects 60 through 74 will represent respective sections of RAM 30A and RAM 30B. Specifically, as indicated by the memory addresses shown at the left side of FIG. 3A, each one of child memory objects 60 through 74 represents a distinct 0.5 GB section within the 4 GB physical address space. Thus, in the example embodiment, each child memory object (e.g., each ACPI memory device) describes one half of a particular physical memory module.

Referring again to FIG. 2, after all of the memory objects have been configured, BIOS 44A begins monitoring for memory errors, as shown at block 222. For instance, error recovery logic 46A may monitor SMBus 22A and track memory errors for each memory object against a predetermined error threshold. If no error is detected, operating system 48 continues to operate normally and BIOS 44A continues to monitor for memory errors, as depicted by the arrow returning to block 218. However, if a memory error is detected, BIOS 44A determines whether an accumulated total of memory errors for that memory object exceeds a predetermined threshold, as shown at block 230. If the threshold has not been exceeded, the process returns to block 218.

Once the threshold is exceeded, error recovery logic 46A generates an eject event (e.g., an SCI) for that memory object, as shown at block 232. Operating system 48 then receives the eject event from BIOS 44A as indicated at block 234 and, in response, discontinues using the corresponding memory range through whatever means are appropriate. For instance, if that memory object contains discardable memory, the operating system may simply mark the virtual page as not present. Alternatively, if the memory object represents memory that is swappable, the operating system may preserve the contents of the memory object by writing the contents to the swap file, as indicated at block 236. Additional means for preserving data from the memory object that is suffering from the error condition will be readily apparent to those of ordinary skill in the art. As indicated at block 238, operating system 48 may then call an eject method, such as the ACPI method known as "_EJx".

After discontinuing use of the faulty memory, operating system 48 may return control to BIOS 44A, as depicted at block 240.

For instance, in one implementation, the operating system is ACPI aware, and the general method for error recovery is to use the ACPI 2.0 memory hot-eject method. In such an implementation, once the BIOS detects a condition that indicates a memory area is going bad (e.g., multiple error correction codes (ECCs)), the BIOS may generate an event to the operating system. The operating system may then call the ACPI eject method. As a result, the operating system thinks the memory has been ejected and therefore discontinues using the memory range. However, it is preferably unnecessary to physically eject the memory. The error recovery logic may simply use this process to make the memory unavailable to the operating system.

In FIG. 3B, the series of Xs illustrates that an error threshold has been exceeded in memory object 64. FIG. 3C shows that, after operating system 48 has discontinued using memory object 64, memory controllers 16A and 16B no longer map the corresponding section of memory in the memory address table. Likewise, that section of memory is no longer part of the physical address space.

Referring again to FIG. 2, after operating system 48 has returned control to BIOS 44A, error recovery logic 46A determines whether dynamic recovery is enabled, as shown at block 250. If dynamic recovery is not enabled, operating system 48 continues to operate normally and BIOS 44A continues to monitor for memory errors, as depicted by the arrow returning to block 218.

If dynamic recovery is enabled, the process passes from block 250 to block 252. Block 252 illustrates error recovery logic 46A examining the memory error or errors that precipitated the recovery process to identify good and faulty subsection of the memory that was ejected. As depicted at block 254, error recovery logic 46A then creates new objects for the good subsections and, as depicted at block 256, generates a notify event, such as an SCI, identifying one of the new memory objects for operating system 48. For instance, the notify event may be an ACPI "insert" event, and that event may advise operating system 48 that the identified memory object is available for use. Operating system 48 then receives the notify event from BIOS 44A and, in response, identifies and configures the indicated memory object, as shown at blocks 258 and 260.

Figure 3D:
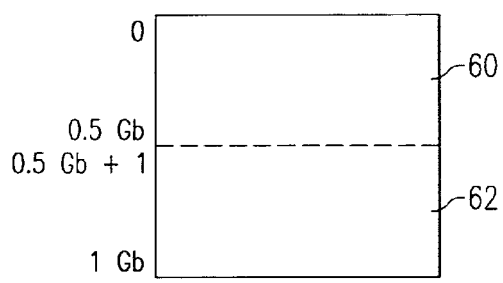
Figure 3D:
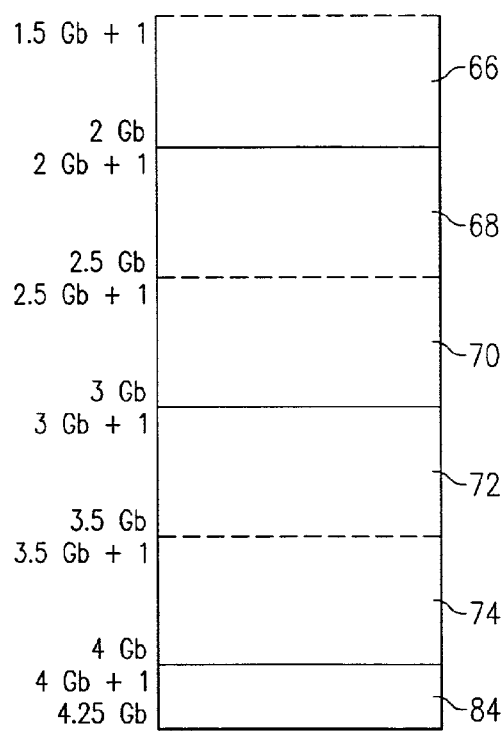

For example, error recovery logic 46A may determine that the first half of memory object 64 is good, the last quarter of memory object 64a is good, and the faulty section is isolated within the third quarter of memory object 64a. Consequently, error recovery logic 46A may create new objects representing the first half and the last quarter of the physical memory formerly represented by memory object 64. As shown in FIG. 3D, after operating system 48 has configured the new memory object 84 to utilize the first half of memory object 64, the address space associated with memory object 84 may be added to the end of the physical address space.

Figure 3E:
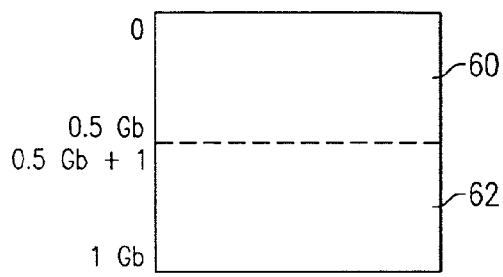
Figure 3E:
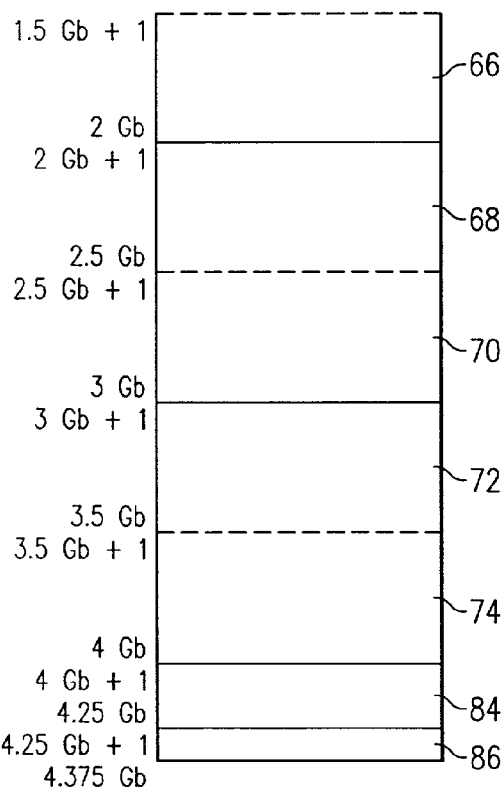

As shown at blocks 262 and 270 of FIG. 2, operating system 48 returns control to BIOS 44A after configuring each new memory object, and BIOS 44A determines whether all new objects have now been configured. If not, the process returns to block 256, with BIOS 44A generating a notify event for the next new memory object, and with operating system 48 configuring the new memory object, as described above. For instance, as shown in FIG. 3E, a new memory object 86 may be added to the memory address table and the physical address space, and new memory object 86 may represent the fourth quarter subsection of the section of memory formerly represented by memory object 64. Once all new memory objects have been configured, the process passes from block 270 to block 218, and operating system 48 continues to operate normally and BIOS 44A continues to monitor for memory errors, as described above.

Thus, in the embodiment illustrated above, when an error can be isolated to a particular section of memory row 80, BIOS 44A and operating system 48 create an eject event for the memory object that describes the section within the row that contains the error. The remainder of the row can remain in use. Error recovery logic 46A may analyze the error data from SMBus 22A to determine whether the error can be isolated to a device within the row (e.g., a failing DIMM or a failing section of a particular DIMM).

In addition, substantially concurrently with the operations of error recovery logic 46A, error recovery logic 46B performs the same or similar operations from the flowchart of FIG. 2, with regard to RAM 30B. Operating system 48 responds similarly to notifications such as insert and eject events from error recovery logic 46A and 46B. For instance, once an object has been ejected, operating system 48 stops using the corresponding section of memory, whether the error was detected by error recovery logic 46A or error recovery logic 46B. Nodes 10A and 10B thus cooperate to provide error recovery for NUMA system 11. In alternative embodiments, however, error recovery logic in one node may communicate with and manage memory in a second node. For instance, in a NUMA system with two nodes, each could include recovery logic that communicates with and manages memory in both nodes.

As described above, NUMA system 11 can also dynamically recover good sections of memory that might otherwise remain unusable. For example, BIOS 44A and operating system 48 may create and insert ACPI objects which describe the remaining good regions of the row. In this way, BIOS 44A can dynamically map out the smallest amount of memory necessary to isolate the failing components.

Alternatively, if an error cannot be isolated to a particular section of a memory row, then an eject event may be issued for a parent memory object that represents an entire memory row.

In conclusion, as will be evident from the above description, NUMA system 11 provides numerous advantages, relative to prior systems and methods for recovering from memory errors such as spare row recovery. For example, the illustrated embodiment contains no spare memory row, so there is no wasted memory. Also, NUMA system 11 is capable of handling a much higher number of memory errors. With spare row recovery, there is a limited number of spare rows (typically, one). By contrast, NUMA system 11 may continue to execute after recovering from multiple memory errors.

In addition, NUMA system 11 can isolate failure at a finer granularity (e.g., a field replaceable unit (FRU) on a DIMM, as opposed to an entire row of DIMMs). An additional advantage of the dynamic recovery option is that BIOS 64A can map out the smallest possible amount of memory necessary to isolate the failure. Good sections of memory are not permanently mapped out if there is a small isolatable section of bad memory.

Furthermore, the recovery procedure disclosed above works well in both monolithic and distributed shared memory systems (e.g., cc-NUMA systems). The recovery procedure may also be implemented without additional hardware support.

Although the present invention has been described with reference to an example embodiment, those with ordinary skill in the art will understand that numerous variations of the example embodiment could be practiced without departing from the scope and spirit of the present invention. For example, multiple memory objects are created for each row in the example embodiment to simulate a finer memory granularity. Moreover, multiple memory objects are created for each memory module in the example embodiment. In alternative embodiments, however, the BIOS may create memory objects that have different relationships with the memory rows and memory modules. For instance, the BIOS may simply create one memory object for each row. Such an embodiment would provide the benefit of facilitating error recovery while also supporting full utilization of all installed memory. Another embodiment may include multiple memory objects for each memory row but may omit support for identifying and re-inserting good subsections of memory following ejection of a bad section. Many other variations may be used in other systems, depending on different factors for different implementations. Those factors may include memory requirements, memory cost, dependability requirements, overall system cost, etc.

Also, the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic or optical carriers. The control logic may also be referred to as a program product.

Many other aspects of the example embodiment may also be changed in alternative embodiments without departing from the scope and spirit of the invention. The scope of the invention is therefore not limited to the particulars of the illustrated embodiments or implementations but is defined by the appended claims.

What is claimed is:

1. A method of recovering from memory errors, the method comprising:
   detecting multiple memory modules in a system; and
   in response to detecting the multiple memory modules, creating a greater number of memory objects to represent respective sections of the multiple memory modules;
   detecting a memory error in a section of computer memory using a basic input and output system (BIOS); and
   in response to detecting the memory error, the BIOS instructing an operating system to discontinue use of the section of computer memory with the memory error.

2. The method of claim 1, wherein:
   the operation of instructing the operating system to discontinue use of the section of computer memory with the memory error comprises sending an eject event from the BIOS to the operating system, wherein the eject event identifies the memory object that represents the section of computer memory with the memory error.

3. The method of claim 2, further comprising:
receiving the eject event from the BIOS; and
in response to receiving the eject event, invoking an eject method to disable the section of computer memory with the memory error.

4. The method of claim 1, further comprising using an advanced configuration and power interface (ACPI) eject control method to disable the section of computer memory with the memory error.

5. The method of claim 1, further comprising:
identifying a good subsection and a bad subsection of the section of computer memory with the memory error;
creating a new memory object to represent the good subsection; and
instructing the operating system that the new memory object is available for use.

6. The method of claim 1, wherein the operation of detecting a memory error comprises detecting that an error threshold has been exceeded.

7. An information handling system that automatically recovers from memory errors, the information handling system comprising:
computer memory;
a processor in communication with the computer memory;
an operating system residing in the computer memory and executable by the processor;
a basic input-output system (BIOS) residing in the computer memory and executable by the processor; and
recovery logic in the BIOS that performs operations comprising:
detecting multiple memory modules in a system; and
in response to detecting the multiple memory modules, creating a greater number of memory objects to represent respective sections of the multiple memory modules;
detecting a memory error in a section of the computer memory; and
in response to detecting the memory error, instructing the operating system to discontinue use of the section of computer memory with the memory error.

8. The information handling system of claim 7, wherein the computer memory comprises multiple random access memory (RAM) modules.

9. The information handling system of claim 7, wherein the recovery logic instructs the operating system to discontinue use of the section of computer memory with the memory error by sending an eject event to the operating system; and
the eject event identifies the memory object that represents the section of computer memory with the memory error.

10. The information handling system of claim 9, wherein:
the operating system receives the eject event from the BIOS; and
in response to receiving the eject event, the operating system invokes an eject method to disable the section of computer memory with the memory error.

11. The information handling system of claim 7, wherein the operating system uses an advanced configuration and power interface (ACPI) eject control method to disable the section of computer memory with the memory error.

12. The information handling system of claim 7, wherein the recovery logic performs further operations comprising:

identifying a good subsection and a bad subsection of the section of computer memory with the memory error;
creating a new memory object to represent the good subsection; and
instructing the operating system that the new memory object is available for use.

13. The information handling system of claim 12, further comprising:
a memory controller in communication with the processor and the computer memory;
a memory address space that the memory controller maps to the computer memory; and
wherein the information handling system makes the new memory object available for use by causing the memory controller to add a new range of memory addresses to the memory address space.

14. The information handling system of claim 7, further comprising:
at least first and second nodes, wherein the first node contains the processor and a portion of the computer memory, the second node contains another processor and another portion of the computer memory; and
wherein, after the recovery logic in the BIOS has instructed the operating system to discontinue use of the section of computer memory with the memory error, the first and second nodes both stop using the section of computer memory with the memory error.

15. A program product for recovering from errors in memory of an information handling system, the program product comprising:
a computer-usable medium; and
instructions encoded on the computer-usable medium, wherein the instructions, when executed by the information handling system, perform operations comprising:
detecting multiple memory modules in the information handling system; and
in response to detecting the multiple memory modules, creating a greater number of memory objects to represent respective sections of the multiple memory modules;
detecting an error in a section of the memory module; and
in response to detecting the error, instructing an operating system of the information handling system to discontinue use of the section of memory with the error; and
wherein the computer-usable medium further comprises a basic input and output system (BIOS) that includes the instructions which detect the error and instruct the operating system to discontinue use of the section of memory with the error.

16. The program product of claim 15, wherein:
the instructions to discontinue use of the section of computer memory with the memory error comprise an eject event; and
the eject event identifies the memory object that represents the section of computer memory with the memory error.

17. The program product of claim 15, wherein the computer-usable medium further comprises an eject method that disables the section of computer memory with the memory error in response to the eject event.

18. The program product of claim 17, wherein the eject method comprises an advanced configuration and power interface (ACPI) eject control method.

19. The program product of claim 15, wherein the computer-usable medium further comprises instructions that perform operations comprising:

identifying a good subsection and a bad subsection of the section of memory module with the memory error;

creating a new memory object to represent the good subsection; and instructing the operating system that the new memory object is available for use.

20. An information handling system that automatically recovers from memory errors, the information handling system comprising:

computer memory;

at least a first and second processor in communication with the computer memory;

a first node comprising the first processor and a first portion of the computer memory;

a second node comprising the second processor and a second portion of the computer memory;

an operating system residing in the computer memory and executable by the processors;

a basic input-output system (BIOS) residing in the computer memory and executable by the processors;

recovery logic in the BIOS that performs operations comprising:

detecting multiple memory modules in the information handling system; and in response to detecting the multiple memory modules, creating a greater number of memory objects to represent respective sections of the multiple memory modules;

detecting a memory error in at least one section of at least one memory modules;

in response to detecting the memory error, instructing the operating system to discontinue use of the section of the memory module with the memory error; and wherein, after the recovery logic in the BIOS has instructed the operating system to discontinue use of the section of the memory module with the memory error, the first and second nodes both stop using the section of the memory module with the memory error.

* * * * *